United States Patent
Satony et al.

(10) Patent No.: US 12,259,004 B2
(45) Date of Patent: Mar. 25, 2025

(54) MODULAR ROLLING ELEMENT CAGE

(71) Applicant: Accuride International GmbH, Diez (DE)

(72) Inventors: Christian Satony, Urbar (DE);
Christoph Neuhaus, Niederelbert (DE);
Sebastian Vermeulen, Birlenbach (DE);
Desiree Schachner, Waldems (DE)

(73) Assignee: Accuride International GmbH, Diez (DE)

( * ) Notice: Subject to any disclaimer, the term of this patent is extended or adjusted under 35 U.S.C. 154(b) by 55 days.

(21) Appl. No.: 18/226,009

(22) Filed: Jul. 25, 2023

(65) Prior Publication Data

US 2024/0044365 A1 Feb. 8, 2024

(30) Foreign Application Priority Data

Aug. 4, 2022 (DE) .................. 10 2022 119662.3

(51) Int. Cl.
  *F16C 29/04* (2006.01)
  *F16C 33/38* (2006.01)
  *F16C 33/66* (2006.01)

(52) U.S. Cl.
  CPC ............ *F16C 29/043* (2013.01); *F16C 29/04* (2013.01); *F16C 33/3812* (2013.01); *F16C 33/6614* (2013.01); *F16C 2226/76* (2013.01)

(58) Field of Classification Search
  CPC .... F16C 29/04; F16C 29/043; F16C 33/3812; F16C 33/3856; F16C 2226/76; F16C 29/045; F16C 29/046
  See application file for complete search history.

(56) References Cited

U.S. PATENT DOCUMENTS 9,386,852 B2 * 7/2016 Stijns ............... F16C 43/04
2007/0058888 A1 3/2007 Chen et al.
(Continued)

FOREIGN PATENT DOCUMENTS

DE       1849526 U    4/1962
DE  202006001559 U1   4/2006
(Continued)

OTHER PUBLICATIONS

European Search Report for EP Patent Application No. 23185786.3, Issued on Dec. 18, 2023, 7 pages.
(Continued)

*Primary Examiner* — Phillip A Johnson
(74) *Attorney, Agent, or Firm* — MEDLER FERRO WOODHOUSE & MILLS PLLC

(57) ABSTRACT

A rolling element cage for positioning a plurality of rolling elements between two rail elements of a telescopic rail or a linear guide which are mounted so as to be movable relative to each other is provided. The rolling element cage is composed or can be composed of two or more module elements which include a base module and one or more extension modules. Each module element has at least two receiving legs, each having one or more openings for receiving rolling elements, and at least one connecting section connecting the two receiving legs, the base module and the one or more extension modules being fixedly or releasably connected or connectable to one another in series in the longitudinal direction of the rolling element cage via fasteners.

20 Claims, 4 Drawing Sheets

(56) References Cited

U.S. PATENT DOCUMENTS

2007/0065055 A1\* 3/2007 Pan .................... F16C 33/3825
384/51
2015/0043842 A1 2/2015 Stijns et al.

FOREIGN PATENT DOCUMENTS

| DE | 2602265 A1 \* | 6/2007 | |
|---|---|---|---|
| DE | 102005047620 B3 \* | 6/2007 | ............. F16C 29/04 |
| DE | 112013001578 B4 | 9/2021 | |
| EP | 0111439 A1 | 6/1984 | |
| EP | 1803949 A1 | 7/2007 | |
| JP | 2009085303 A \* | 4/2009 | ............. F16C 29/04 |
| WO | 2006/028143 A1 | 3/2006 | |
| WO | 2013/141709 A1 | 9/2013 | |

OTHER PUBLICATIONS

German Search Report received for DE Application No. 102022119662.3, mailed on Apr. 28, 2023, 7 pages of Original Document only.

\* cited by examiner

MODULAR ROLLING ELEMENT CAGE

SUBJECT MATTER OF THE INVENTION

The present invention relates to a rolling element cage for positioning a plurality of rolling elements between two rail elements of a telescopic rail or a linear guide, which are mounted so as to be movable relative to each other. The invention also includes a telescopic rail as well as a linear guide having rail elements mounted for movement relative to one another and at least one rolling element cage according to the invention.

BACKGROUND OF THE INVENTION

Telescopic rails and linear guides with two or more rail elements mounted so as to be movable relative to one another are used in furniture, household appliances and many other applications, for example also in automobile and aircraft construction for adjusting passenger seats or for moving a wide variety of elements such as armrests, consoles, etc. Since direct sliding of the rail elements against each other is associated with high friction, rolling elements are used between the rail elements, which roll on running surfaces provided on the rail elements when the rail elements are moved. For positioning and for uniform distribution of the rolling elements between the running surfaces of two rail elements that can be moved against each other, the rolling elements are guided in rolling element cages. The rolling element cage ensures a defined distance between the rolling elements in the direction of travel and prevents the rolling elements from diverging in an uncontrolled manner during travel of the rail elements or even converging and contacting each other, which would cause the rolling elements to rub against each other when rolling on the running surfaces of the rail elements.

In telescopic rails and linear guides, one rail element is usually fixed as a so-called stationary rail element, e.g. on a corpus, while at least one other rail element is movable relative to this stationary rail element. The mutually movable rail elements of telescopic rails usually have the same or similar length. Telescopic rails with exactly two rail elements that can be moved against each other are also referred to as partial extension rails because they cannot be extended to twice their length due to the length of the rolling element cage between the rail elements that limits the extension. If at least one further rail element is movably mounted on the rail element that can be moved relative to the stationary rail element, this is referred to as a full extension rail. In the case of linear guides, a short rail element, also known as a carriage or slide, is usually mounted so that it can move on a significantly longer stationary rail element.

Depending on the application, telescopic rails and linear guides are dominated by different requirements, such as load-bearing capacity, ease of movement, smooth running, feel during travel, etc. In addition to the geometry and material of the rail elements themselves, these requirements are influenced by the selection, number and positioning of the rolling elements as well as by the type of rolling element cage. Known rolling elements that can be used in the sense of the present invention include balls, rollers, barrels, needles or cones.

In order for the rail elements of a telescopic rail or a linear guide to bear against each other via the rolling elements and at the same time be connected to each other in such a way that they do not inadvertently separate from each other, a typical rail element has at least two running surfaces for rolling the rolling elements. Telescopic rails are also known in which rail elements each having three or four running surfaces are mounted so as to be movable relative to one another. Each of the running surfaces of a rail element is opposite a corresponding running surface of the rail element mounted movably thereon.

The rolling element cage positions the rolling elements between the running surfaces of the rail elements. For this purpose, the rolling element cage has receiving legs which extend between the running surfaces of the rail elements and have openings distributed in the longitudinal direction, i.e. in the direction of travel of the rail elements, for receiving and positioning the rolling elements. The receiving legs arranged in each case between two running surfaces of the two rail elements which can be moved relative to one another are usually connected to one another by a connecting section. If this connection between the receiving legs is missing, the cages are referred to as strip rolling element cages. On the one hand, however, the connection between the receiving legs has manufacturing advantages, since it allows the rolling element cage to be manufactured in one piece and facilitates installation of the rolling element cage with the rolling elements between the rail elements. More significantly, however, the connection of the receiving legs ensures that they do not move to different positions in the direction of travel and/or come to rest at different positions when the rail elements are moved, which can result in unfavorable load transfer, poor running characteristics and a shortening of the pull-out distance of the rail elements.

Rolling element cages are usually manufactured from sheet steel or plastic, For manufacture from sheet steel, the required contours and openings are punched or cut out from a flat sheet, and the sheet is then shaped into the desired spatial form of the rolling element cage by various bending processes. Plastic rolling element cages are usually manufactured in one piece by injection molding. Compared with those made of sheet steel, they are characterized by better running smoothness of the telescopic slides and linear guides equipped with them and are therefore frequently used in applications where travel noise is to be avoided as far as possible and a pleasant feel is desired, for example in automotive engineering for moving consoles or other elements close to the passenger compartment.

Different requirements for the traverse paths and properties of the telescopic rails and linear guides to be installed, such as load capacity, smooth running, haptics, etc., require not only different lengths of the rail elements, but also a correspondingly adapted number and positioning of the rolling elements between the rail elements, for which in turn different rolling element cages in different lengths and possibly also differently positioned receptacles for the rolling elements are required.

For the manufacture of plastic rolling element cages by injection molding, an individual injection molding tool (injection mold) is required for each embodiment of a rolling element cage in terms of its length and/or positioning of the receptacles for the rolling elements. Since the cost of such an injection mold is already high, the manufacture or stocking of a large number of rolling element cages of different lengths can be uneconomical, especially when manufacturing telescopic rails and linear guides in small batches.

One solution, at least for the provision of rolling element cages of different lengths, could be to manufacture very long rolling element cages using an injection molding tool designed for this purpose and then to shorten them by cutting them to the length required for the particular requirement. However, this wastes valuable resources in the form of the material that is cut off and no longer needed. In addition, the off-cut material must subsequently be disposed in a costly manner or at least recycled, insofar as this is possible at all. Furthermore, with this solution, the positioning of the receptacles for the rolling elements would be fixed and not variable.

OBJECT OF THE INVENTION

The object of the present invention was therefore to realize the provision of rolling element cages of different lengths and, where appropriate, different positioning of the receptacles for the rolling elements in the most cost-effective and resource-saving manner possible.

DESCRIPTION OF THE INVENTION

According to the invention, this object is solved by a rolling element cage for positioning a plurality of rolling elements between two rail elements of a telescopic rail or a linear guide which are mounted so as to be movable relative to one another,
  wherein the rolling element cage is composed or can be composed of two or more module elements comprising a base module and one or more extension modules,
  wherein each module element has two receiving legs each having one or more openings for receiving rolling elements and a connecting section connecting the two receiving legs, wherein the base module and the one or more extension modules are fixedly or detachably connected or connectable to each other in series in the longitudinal extension direction of the rolling element cage.

When, in connection with the rolling element cage according to the invention, reference is made to a longitudinal extension direction of the rolling element cage or the module elements, this refers to the direction parallel to the receiving legs. The longitudinal extension direction of the rolling element cage or the module elements corresponds essentially to the direction of travel of the two rail elements of a telescopic rail or a linear guide, which are mounted so as to be movable relative to one another, when the rolling element cage is arranged between them for positioning the rolling elements.

According to the invention, each module element has two receiving legs, each with one or more openings for receiving rolling elements, and a connecting section connecting the two receiving legs. The base module preferably has several openings in each receiving leg for receiving rolling elements. In preferred embodiments of the invention, each receiving leg of the base module has two, three, four, five, six, seven, eight, nine, ten or more openings for receiving rolling elements. One or more extension modules are added in series to the base module and fixedly or releasably connected thereto to provide a rolling element cage having the desired or required length and number of openings for receiving rolling elements. In preferred embodiments of the invention, extension modules have one, two, three, four, five, six, seven, eight, nine, ten or more openings in each receiving leg for receiving rolling elements.

A rolling element cage for a telescopic rail or linear guide usually has at least four to ten rolling elements per receiving leg, since otherwise stable mounting and good running properties cannot be guaranteed when the rail elements are moved against each other. The longer the rail elements to be moved against each other, the longer the rolling element cage should be and the greater the number of rolling elements accommodated therein.

In a preferred embodiment of the invention, the connecting section of a modular element is formed as a flat strip or flat band, at the opposite lateral edges or edges of which, which run parallel to the direction of longitudinal extension, a receiving leg with the openings, which is also formed as a strip or band, adjoins in each case. The receiving legs are angled relative to the connecting section, the angle of the receiving legs relative to the connecting section depending on the profile of the rail elements to be moved relative to one another. In one embodiment of the invention, the receiving legs are angled at an angle of about 80 to 100° with respect to the connecting section, preferably at an angle of about 90°, i.e. substantially perpendicular. When viewed in the direction of longitudinal extension, such a rolling element cage or modular element with two receiving legs therefore preferably has a substantially C-shaped cross-section. However, the connecting section does not necessarily have to extend continuously over the entire length of the receiving legs. According to the invention, the connecting section can also be realized by one or more narrow webs between the receiving legs. Several individual narrow webs between two receiving legs of a module element are therefore to be understood as a connecting section in the sense of the invention.

Where reference is made herein to the rolling element cage or each module element having two receiving legs and a connecting section connecting the receiving legs, this does not exclude further receiving legs and connecting sections on the rolling element cage or the module elements. Also encompassed by the invention are embodiments of the rolling element cage and thus also of the individual module elements, each having three or four receiving legs with openings for receiving rolling elements, each of which is connected to one another by connecting sections. Such rolling element cages are suitable, for example, for telescopic rails in which the rail elements each have three or four running surfaces for the rolling elements.

When reference is made herein to module elements, namely the base module and one or more extension modules, being connected to each other "in series", this describes that first the base module is fixedly or detachably connected at one of its end portions lying in the longitudinal direction of extension to one of the end portions of an extension module. On at least these end sections, the base module and the extension module have matching fastening means, i.e. connection structures that allow the two module elements to be connected in a fixed or detachable manner. For connecting the base module to a plurality of extension modules in series, each extension module which, starting from the base module, is connected or connectable to further module elements in the direction of longitudinal extension, has fastening means at each of its two end portions for connection to further module elements, namely on the one hand for connection to the base module or to an extension module preceding in the direction of the base module and on the other hand for connection to an extension module following in series.

It is understood that the base module and the last (terminal) extension module arranged in series of the rolling element cage, which forms the termination in the row of connected module elements, do not require any more fastening means for further extension modules at the respective outer end sections, which are not connected to further module elements. However, the presence of such fastening means at the respective ends of a rolling element cage is generally not associated with disadvantages for the rolling element cage or the function and running properties of the telescopic rail or linear guide. The invention therefore includes embodiments in which the base module and/or the terminal extension module each have fastening means at both end portions of the module elements for fixed or detachable connection to further module elements. As a base module and as a terminal extension module, therefore, module elements can also be used which are designed like the extension modules arranged in between and have fastening means at both end sections in each case, which are then not or will not be connected to further module elements without any disadvantage in the assembled rolling element cage. Each module element with fastening means at both end sections can be used both as a basic module and as an extension module, so that only one embodiment of a module element with a certain number of openings needs to be manufactured, which in turn saves tooling and manufacturing costs for the module elements and allows module elements to be used more flexibly. Therefore, according to the invention, already with a single embodiment of a module element, which can be used as a base module and for extension as an extension module, a plurality of rolling element cages of different lengths with an integer multiple of the length or number of openings of the individual module element can be assembled.

In one embodiment of the invention, the openings distributed in the receiving legs of the assembled rolling element cage in the longitudinal extension direction for receiving rolling elements are arranged at equal distances from one another. Accordingly, in this embodiment, the openings in the individual module elements from which the rolling element cage is assembled are arranged at equal distances from one another. In this case, the openings closest to the respective end portions of a module element are also arranged at such a distance from the end portions that the spacing of the openings across the connection of two module elements is also the same. In an alternative embodiment, however, the openings in the receiving legs of the assembled rolling element cage can also be arranged at different distances from one another in the longitudinal direction of extension if this is necessary or advantageous for the particular application of the telescopic rail or linear guide. For example, the spacing of the openings along the receiving legs in the longitudinal direction of the assembled rolling element cage may increase or decrease from the base module to the last extension module in order to provide a higher number or denser arrangement of rolling elements in the rolling element cage in a particular direction of travel of the rail elements than in the opposite direction of travel, which may be associated with advantages in terms of load transfer in particular travel positions or operations. In an alternative embodiment, a higher number or denser arrangement of openings and thus of rolling elements is provided at the two end sections of the rolling element cage lying in the longitudinal direction of extension than towards the center thereof. Such a distribution of the openings and thus of the arrangement of the rolling elements in the rolling element cage can, in certain applications and under mechanical loads over longer periods of time, result in smoother running behavior, reduced jerking and greater steadiness when the rail elements are moved. A higher number or denser arrangement of rolling elements at the end sections of the rolling element cage also has advantages in terms of load transfer, since this is where the leverage forces acting on the rolling element cage are greatest, especially when the rail elements of a telescopic rail are extended. The spacing of the openings in the individual module elements for manufacturing such embodiments of the rolling element cage according to the invention with differently spaced openings in the receiving legs must be selected accordingly. For this purpose, module elements can be provided in which the spacing of the openings within the module element varies. Alternatively, different embodiments of module elements can be combined, each of which has the same spacing of the openings within a module element but different spacing from other module elements.

The connection between the module elements by fastening means at their end portions can be a form-fitting connection, a friction-fitting connection and/or a substance-fitting connection. In a preferred embodiment of the invention, the connection between the end portions of two module elements is made by a combination of a form-fitting and a friction-fitting connection. Among other things, a form-fitting connection with a detent in the connected state is suitable in order to prevent unintentional loosening of the connection during operation. Such a latching connection also need not be readily releasable, since the rolling element cage is usually joined only once in the desired length by connecting the module elements and then remains between two rail elements mounted to move against each other for the life time of the telescopic rail or linear guide.

The definition that module elements are "connectable" to one another merely describes that the module elements of the rolling element cage according to the invention can also be present in the non-connected state, i.e. separately from one another, without departing from the idea of the present invention, since the module elements can also be offered and traded in the non-connected state for the purpose that the user selects and connects them to one another according to the desired length of the rolling element cage.

The individual module elements are configured to form a continuous rolling element cage when connected in series. The two receiving legs of each module element, when joined, are thereby aligned with the receiving legs of the next joined module element such that the joining of two or more module elements forms a rolling element cage having two receiving legs formed by the joining, the length of which is equal to the sum of the receiving legs of the individual module elements.

According to the invention, the fastening means by which two module elements can be connected or are connected to one another at their end sections facing one another are matched to one another and designed for such a connection. In principle, a wide variety of form-fitting, friction-fitting and/or substance-fitting connection techniques are known to the skilled person.

In a preferred embodiment of the invention, the fastening means are arranged at the end portions of the receiving legs of the module elements. By connecting the modular elements via their receiving legs, a high structural stability of the rolling element cage assembled from the modular elements is achieved.

Alternatively or in addition to fastening means or connecting structures at the end sections of the receiving legs, a connection of two module elements can be made via fastening means at the end sections of the connecting sections between the receiving legs lying in the longitudinal direction of the module elements. In one embodiment, two modular elements are connected via their connecting sections by means of a sheet butt joint, in that a tab-shaped section (sheet) on one of the connecting sections extends beyond the end of the modular element to below or above the connecting section of the further modular element to be connected, and the over-lapping sections are connected to one another by bonding or welding, preferably by ultrasonic welding or laser welding.

In principle, it is advantageous and preferred according to the invention that the fastening means on each module element match those of each of the other module elements, i.e. are connectable thereto, so that each extension module is connectable both to the base module and to each other extension module. Two fasteners matched for fixed or releasable connection generally do not have the same structure, but must be substantially complementary to each other if they are to engage each other in a form-fitting and/or friction-fitting manner. According to the invention, therefore, "first" and "second" fastening means are provided which have different structures but which match one another and can be connected to one another. Preferably, "first" and "second" fastening means are formed substantially complementary to each other in the sense that they are engageable or connectable with each other.

Thus, in the preferred embodiment of the invention according to the invention, in which the connection of the module elements is effected via fastening means at the end portions of the two receiving legs of the module elements, two fastening means are provided on each side or end of a module element, namely one at each end portion of each receiving leg. It is understood, as stated above, that base modules and/or end extension modules have the fastening means either on only one side or end, or likewise on both sides or ends, depending on the embodiment.

In one embodiment of the invention, in which the fastening means are provided at the end portions of the two receiving legs of the module elements, identical "first" fastening means are provided at the two end portions of the receiving legs aligned with the same end of the respective module element, and identical "second" fastening means are also provided at the two end portions of the receiving legs aligned with the opposite end of the module element, but designed and configured for connection to the "first" fastening means, which are connectable to the "first" fastening means or connecting structures. The inventors refer to this embodiment as a "mirror symmetrical" arrangement of the first and second fastening means.

In this embodiment, any module element can be connected to any other module element, be it a module element of the same embodiment with the same length or number of openings, or a module element of a different embodiment with a different length or number of openings. Module elements of this embodiment can only be connected in series with other module elements in the same orientation with respect to the position of the fastening elements. For connecting two module elements of this embodiment, the module elements are to be aligned such that the two "first" fastening means at the end portions of the receiving legs at the same end of a module element and the two "second" fastening means at the end portions of the receiving legs at the same end of the module element to be connected face each other.

In another preferred embodiment of the invention, in which the fastening means are provided at the end portions of the two receiving legs of the module elements, different fastening means are provided at the two end portions of the receiving legs aligned with the same end of the respective module element, namely a "first" fastening means at the end portion of a first receiving leg and a "second" fastening means at the end portion of the second receiving leg. Different fastening means are also provided crosswise at the two end portions of the receiving legs aligned with the opposite end of the module element, namely a "second" fastening means at the opposite end portion of the first receiving leg and a "first" fastening means at the opposite end portion of the second receiving leg. The inventors refer to this embodiment as a "cross-wise" or "rotationally symmetrical" arrangement of the first and second fastening means.

In this embodiment, any module element can also be connected to any other module element. However, the "rotationally symmetrical" arrangement of this embodiment has the further advantage over the "mirror symmetrical" arrangement that each module element, irrespective of its orientation in the longitudinal extension direction, can be connected in series with any other module element, likewise irrespective of its orientation in the longitudinal extension direction. Among other things, this has advantages in the manual as well as automated assembly of the rolling element cage.

In a preferred embodiment according to the invention, the interconnectable or interconnected fastening means, such as the "first" and "second" fastening means, are designed as tongue and groove connections or as trunnion and mortise connections. The terms tongue and groove connection and trunnion and mortise connection are to be understood broadly in the sense of the invention and comprise different tongue and groove geometries or trunnion and mortise geometries in the sense that tongue and groove or trunnion and mortise represent positive and negative shapes for a connection, preferably a positive connection, against a separation of the module elements in the longitudinal extension direction of the rolling element cage.

In a preferred embodiment of a tongue and groove connection according to the invention, a groove extending perpendicularly to the longitudinal direction of the module element and perpendicularly to the connecting section is formed as a "first" fastening means on the end section of the receiving leg of a first module element, which groove is open from above, i.e. from the side of the receiving leg facing away from the connecting section, for the insertion of a tongue arranged as a "second" fastening means on the end section of the receiving leg of a second module element as a positive form to the groove. For connecting the fastening means, the tongue on the second module element is inserted from above into the groove of the first module element in the direction of the connecting section.

In a preferred tongue-and-groove connection of the aforementioned type according to the invention, the tongue is formed as a dovetail tongue and the groove is formed as a dovetail groove or dovetail joint.

In a further preferred embodiment of the tongue and groove connection of the aforementioned type according to the invention, the groove and the tongue are designed for latching engagement when the tongue is inserted into the groove in order to secure the connection against unintentional release. In one embodiment, at least one latching recess, undercut, latching nose or toothing is provided in the groove for this purpose, and a mating surface formed for latching engagement therewith is provided on the tongue.

In a further embodiment according to the invention, the interconnectable or interconnected fastening means are formed as a trunnion and mortise connection, preferably at the end portions of the receiving legs of the module elements. The trunnion expediently extends at the end portion of the receiving leg of a module element in the longitudinal extension direction, and the module element to be connected has a corresponding mortise at the end portion of the receiving leg for receiving the trunnion. In contrast to the previously described tongue and groove connection, the module elements are guided towards each other in the longitudinal extension direction for connecting the trunnion and mortise and the trunnion is inserted into the mortise. Expediently, the trunnion and the mortise are designed for latching engagement when the trunnion is inserted into the mortise to secure the connection against unintentional loosening. In one embodiment, at least one latching recess, undercut, latching nose or toothing is provided in the trunnion hole for this purpose, and the trunnion has a mating surface formed for latching engagement therewith.

In the rolling element cage according to the invention, the receiving legs with the openings for receiving the rolling elements extend between the running surfaces of the rail elements and are essentially formed as strips or bands. The rolling elements in the openings protrude on either side of a receiving leg and are in contact with the opposing running surfaces of the rail elements. It is understood that the extension of the fasteners at the end portions of the receiving legs in the direction of the running surfaces of the rail elements must not be greater than the extension of the rolling elements to the running surfaces, so that the fasteners do not rub against the running surfaces and impair the running characteristics, In a preferred embodiment of the invention, the roping element cage is a ball cage for receiving balls as rolling elements.

In a further preferred embodiment of the invention, each of the openings in the receiving legs of the rolling element cage and thus in the receiving legs of the individual module elements is designed to receive in each case exactly one rolling element, preferably exactly one ball, This ensures the best running properties of a telescopic rail or linear guide equipped with the rolling element cage according to the invention. However, the invention also includes embodiments in which individual, several or all openings can accommodate more than one rolling element, for example two, three or four rolling elements. In this case, individual rolling elements within an opening can be held at a distance from one another by spacers, for example by webs or tabs extending from the edge of the openings, in order to prevent contact between the rolling elements when the rail elements are moved and thus undesirable friction between the rolling elements.

In the plane of the receiving legs, the openings for receiving the rolling elements are suitably dimensioned so that the rolling element can be fully inserted into the opening. In ball cages, the balls should usually be positioned with their center approximately in the plane of the receiving legs for good running properties. The boundaries or edges of the openings can be selected in such a way that at least a small clearance remains between them and the rolling element so that the rolling element is seated with some clearance in the respective opening and the rolling element does not jam in the opening, for example due to certain manufacturing tolerances. However, it can be disadvantageous if the rolling element, such as a ball, can pass completely through the opening, since the rolling element cage can then move back and forth between the running surfaces of the rail elements perpendicular to the direction of travel and rub against the rail elements during travel or, in the most unfavorable case, also tilt.

In a further preferred embodiment of the invention, therefore, passage limiters are provided at the openings in the receiving legs for receiving the rolling elements, which prevent a rolling element from passing completely through the opening, In one embodiment, the passage limiters are formed as contact surfaces extending from the edge of the respective opening and angled out of the plane of the respective receiving leg in the form of tabs or projections, which are arranged to prevent the rolling element received in the respective opening from passing completely through and preferably to hold the rolling element centrally in the respective opening, so that the rolling element protrudes from the opening to approximately the same extent on each side of the receiving leg.

In a further embodiment, the passage limiters are formed in that the diameter at the inner peripheral edge of the opening tapers in the direction perpendicular to the plane of the receiving leg such that the rolling element can be inserted into the opening but cannot pass through. In a preferred embodiment of, for example, a circular opening for receiving a ball as a rolling element, the inner circumferential edge of the opening tapers in a conical or dome shape, whereby the taper may be present over the full circumference of the opening or only in sections. The ball is inserted into the opening, but cannot pass through because it comes into contact with the tapered or dome-shaped inner circumferential edge of the opening.

It is expedient that the passage limiters at the openings of the two opposite receiving legs of a rolling element cage are arranged and designed in such a way that they prevent the rolling elements from passing through in opposite directions, i.e. either toward or away from the respective opposite receiving leg. When the rolling element cage with the rolling elements is installed in a telescopic rail or linear guide, support of the rolling element cage on the rolling elements in opposite directions is thus ensured, and the telescopic rail or linear guide can be installed in any orientation without the risk of the rolling elements passing through the openings and thus displacement of the rolling element cage towards the running surfaces of the rail elements.

In a preferred embodiment of the invention, the passage limiters are arranged and designed at the openings of the two opposing receiving legs of a rolling element cage in such a way that they prevent the rolling elements from passing through in a direction towards the respective opposing receiving leg, i.e. from the outside towards the center of the rolling element cage. This has process-related advantages during subsequent assembly of the telescopic rails or linear guides, in particular during automated insertion of the rolling elements into the rolling element cage from the outside.

In a further embodiment of the invention, recesses or pockets are provided on the inner circumferential edge of the openings in the receiving legs for receiving the rolling elements, which recesses or pockets are designed and suitable for receiving a preferably viscous or pasty lubricant, preferably a lubricating grease. The provision of lubricant at the openings in the immediate vicinity of the rolling elements is particularly advantageous, since the rolling elements come into contact with the lubricant during rolling while the rail elements travel and distribute it to the running surfaces of the rail elements, which in turn improves the running properties of the telescopic rail or linear guide.

FIGURES

Further advantages, features and embodiments of the present invention will become apparent from the following description of an embodiment according to the invention and the accompanying figures. In the figures, the same elements are designated by the same reference signs.

Figure 1:
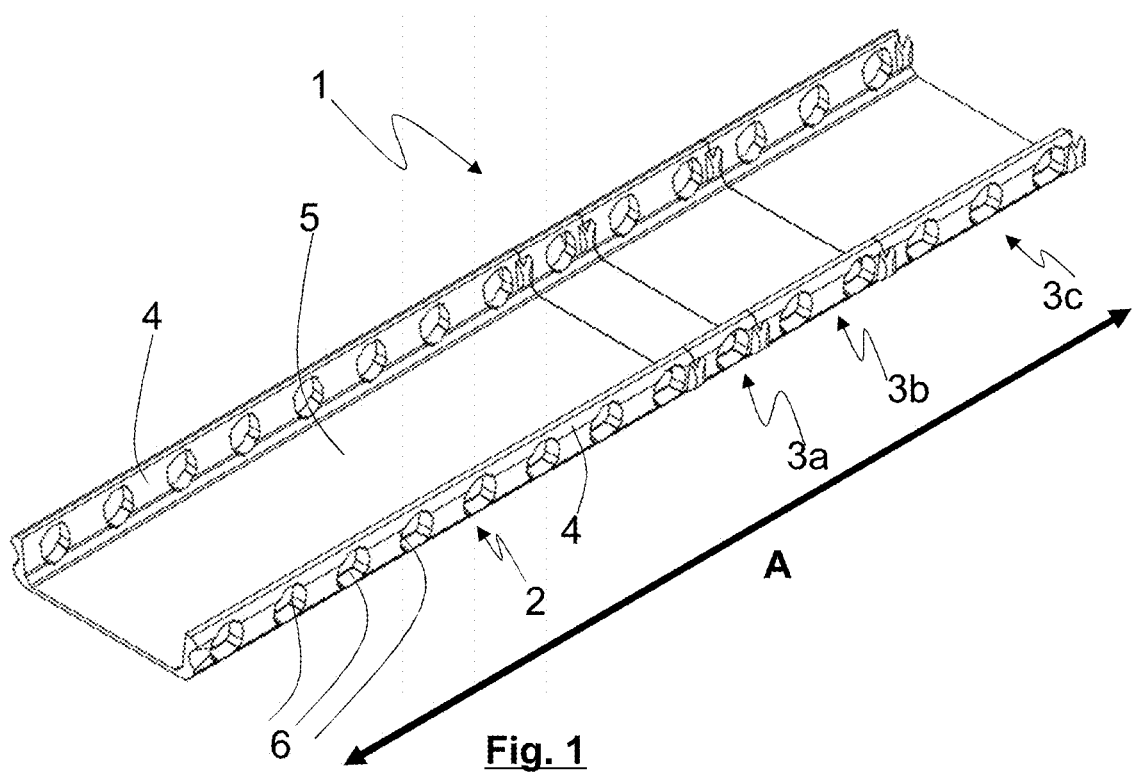
FIG. 1 shows a perspective view of an embodiment of a rolling element cage designed according to the invention as a ball cage with four module elements connected in series, a base module and three extension modules of different lengths with one, two or three openings, respectively, for accommodating rolling elements.
Figure 2:
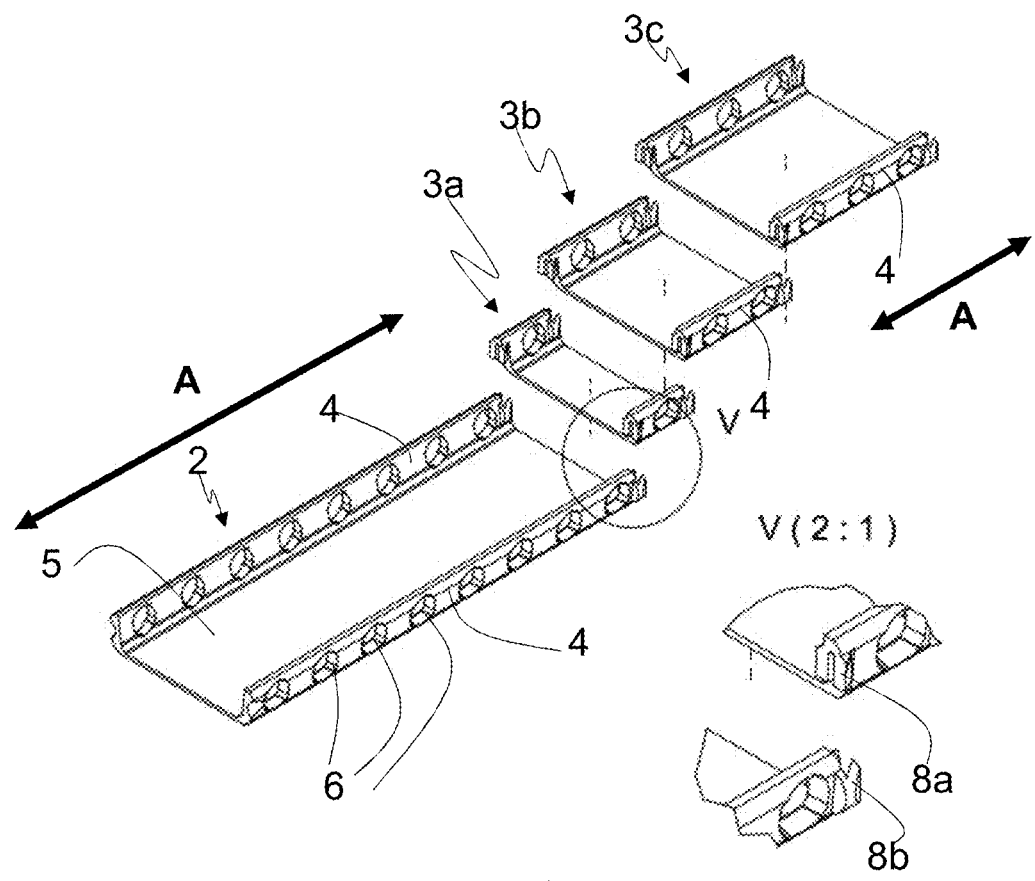
FIG. 2 shows a perspective view of the embodiment of the rolling element cage according to FIG. 1 with module elements separated from each other as well as an enlarged detailed view (circle "V") of the fastening means at the end sections of the receiving legs of two module elements.
Figure 3:
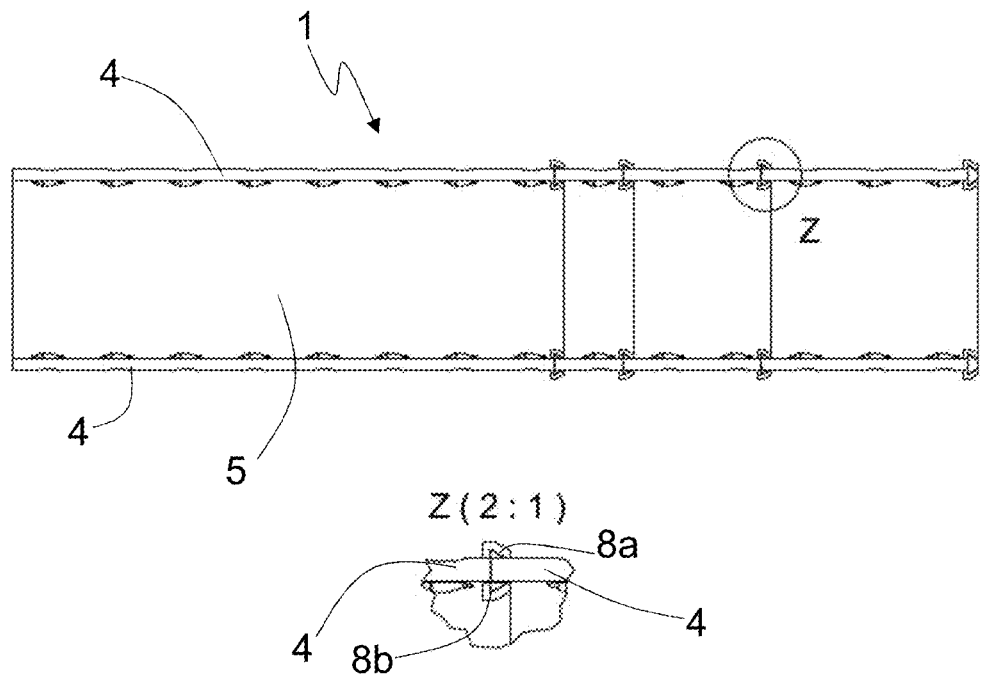
FIG. 3 shows the rolling element cage according to FIG. 1 with connected module elements in a view from above as well as an enlarged detailed view (circle "Z") of the connected fastening means at the end sections of the receiving legs of two module elements.
Figure 4:
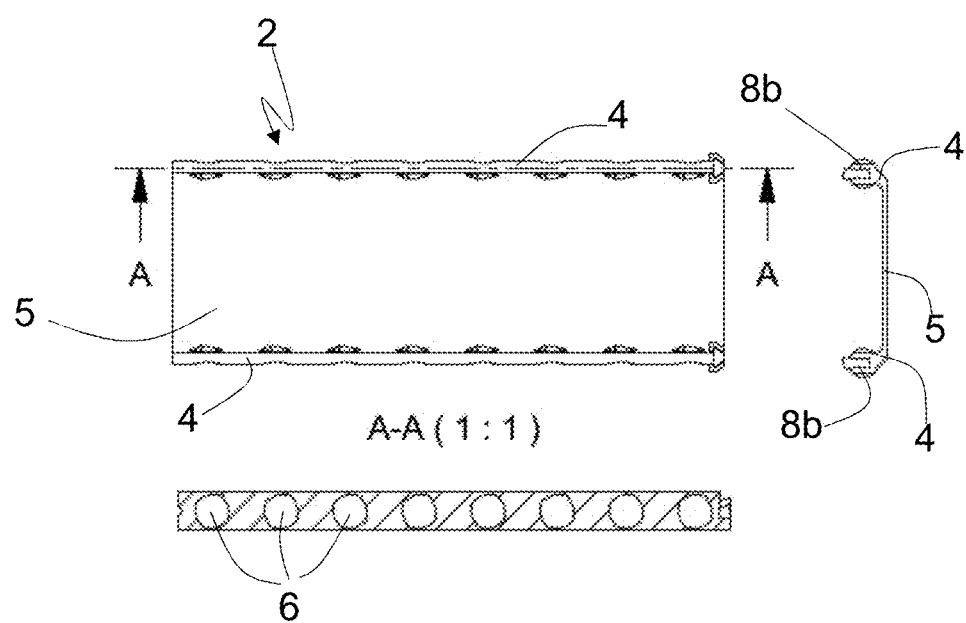
FIG. 4 shows various views of the base module of the rolling element cage according to FIGS. 1 to 3: a view from above, a view looking from the side at the essentially C-shaped profile of the base module as well as at the fastening means arranged at the end sections of the receiving legs, and a view looking in the direction A-A from the inside at one of the receiving legs.
Figure 5:
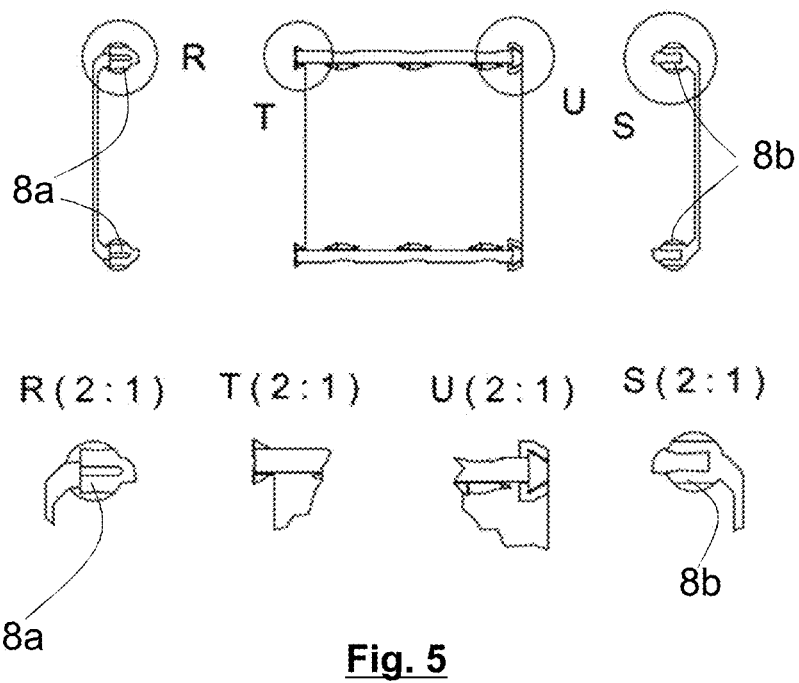

FIG. 5 shows various views of an extension module with three openings in each receiving leg of the rolling element cage according to FIGS. 1 to 3: one view from above and two views, each looking from opposite sides, of the substantially C-shaped profile of the extension module and of the fastening means arranged at the end portions of the receiving legs. FIG. 5 also shows enlarged detailed views (circles "S", "T", "U", "R") of the fastening means at the end sections of the receiving legs of the extension module.

Figure 6:
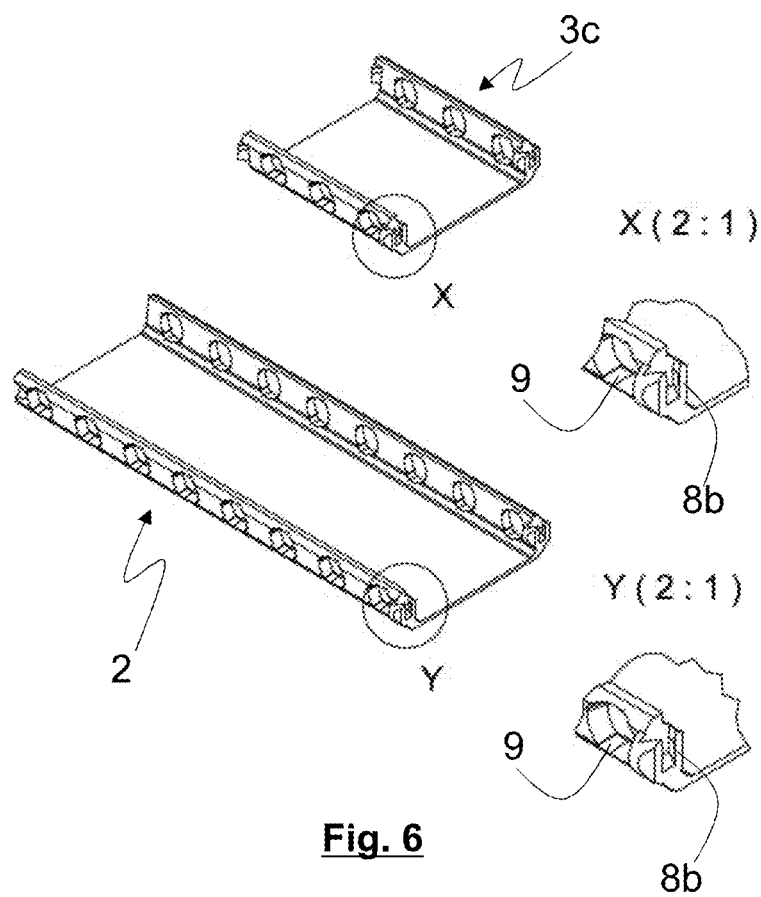

FIG. 6 shows perspective views of the base module as well as the extension module with three openings of the rolling element cage according to FIGS. 1 to 3, looking at the ends of the module elements with "first" fastening means or connection structures at the end sections of the receiving legs as well as enlarged detail views (circles "X", "Y") of the fastening means.

Figure 7:
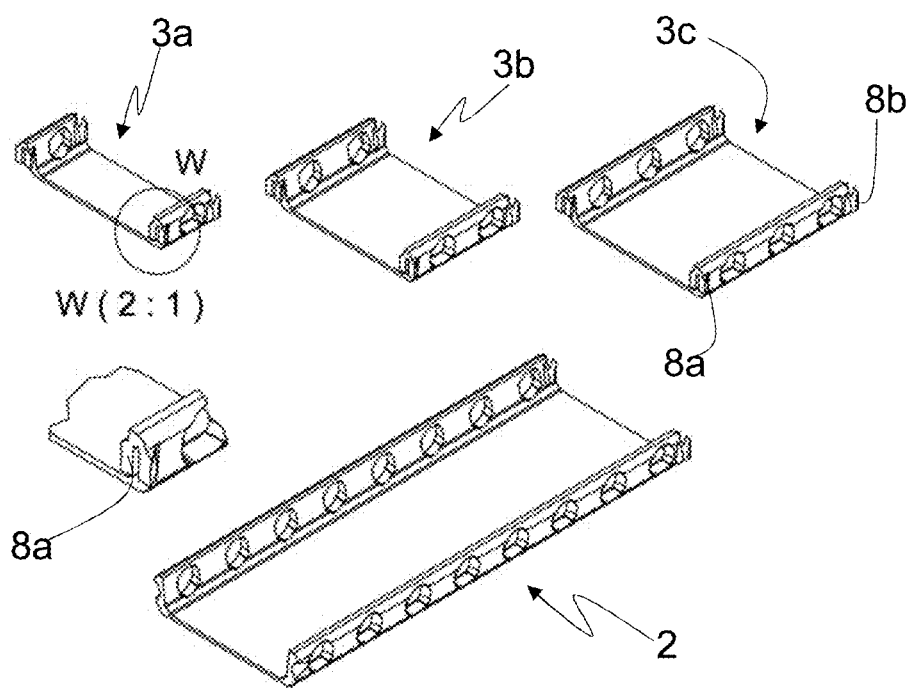

FIG. 7 shows perspective views of the base module as well as the three extension modules of the rolling element cage according to FIGS. 1 to 3 with a view of the opposite ends of the module elements compared to the representation in FIG. 6, whereby the base module has no fastening means at this end and the extension modules have "second" fastening means at the end sections of the receiving legs, as well as an enlarged detail view (circle "W") of the fastening means at the extension module with an opening.

Figure 8:
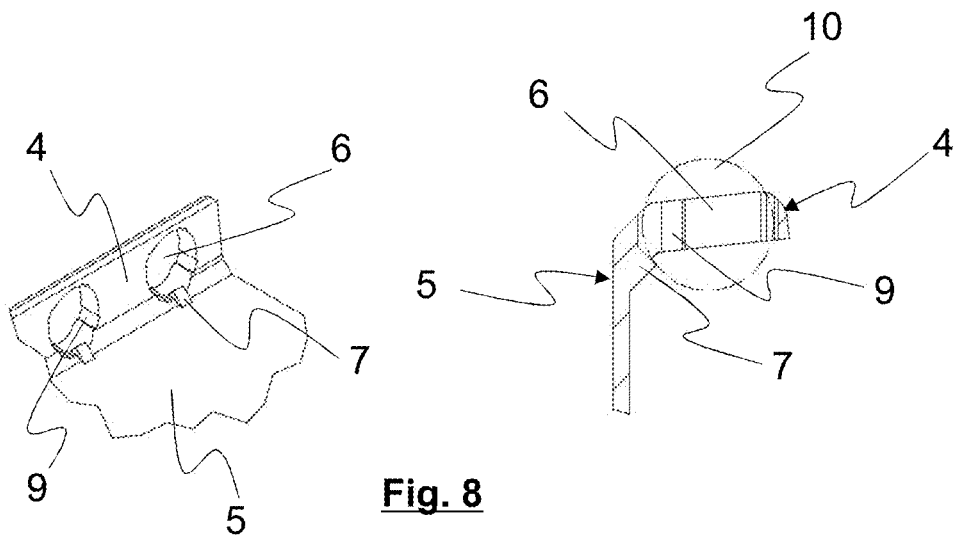

FIG. 8 shows a perspective view and a sectional view of an opening for receiving a rolling element, in this case a ball, in the receiving leg of a module element of an alternative embodiment with a passage limiter designed as a projection.

FIGS. 1 to 7 show various views and elements of an embodiment of a rolling element cage 1 of modular design according to the invention, which is designed as a ball cage and comprises, by way of example, four modular elements connected or connectable to one another in series, namely a base module 2 and three extension modules 3a, 3b and 3c of different lengths with one, two or three openings 6 on each receiving leg 4 for receiving rolling elements, which in this embodiment would be balls (not shown in FIGS. 1 to 7; shown chain-lined in FIG. 8). In the present embodiment, the modular elements are manufactured from plastic by injection molding.

FIGS. 1 and 2 show perspective views of the rolling element cage 1, with FIG. 1 showing the module elements connected in series and FIG. 2 showing the module elements separated from each other. The arrows "A" in FIGS. 1 and 2 illustrate the longitudinal direction of extension of the rolling element cage or the module elements described herein, which also corresponds to the direction of travel of the rail elements of a telescopic rail or linear guide equipped with the rolling element cage.

Each of the individual modular elements has two receiving legs 4 with openings 6 for receiving rolling elements and a connecting section 5 connecting the two receiving legs 4. The connecting section 5 of each modular element is designed as a flat strip or a flat band, to the opposite lateral edges of which, which run parallel to the direction of longitudinal extension, a receiving leg 4, also designed as a strip or band, is connected with the openings 6 at an angle of about 90° to the connecting section 5. When viewed in the direction of longitudinal extension, each modular element and thus also the rolling element cage 1 composed of modular elements therefore has a substantially C-shaped cross-section, as shown for example in FIGS. 4 and 5.

In the embodiment of a rolling element cage 1 according to the invention shown in FIGS. 1 to 7, the fastening means 8a and 8b for connecting the module elements are provided at the end portions of the receiving legs 4 of the module elements, the base module 2 in this embodiment having fastening means for connection to a further extension module at only one end.

In the embodiment shown, the interconnectable or interconnected fastening means 8a and 8b are designed as tongue-and-groove connections, specifically as a dovetail tongue 8a and dovetail groove or dovetail joint 8b, which can be interconnected in a form-fitting and friction-fitting manner against separation of the module elements. The dovetail groove 8b is formed substantially as a negative shape, and the dovetail tongue 8a is formed as a corresponding positive shape. In terms of the above description, the dovetail tongue 8a can be described as a "first" fastener and the dovetail groove 8b can be described as a "second" fastener, which are substantially complementary in shape and connectable to each other.

The extension modules 3a, 3b, 3c each have two fastening means on both sides or ends at the end portions of the receiving legs 4, while in this embodiment the base module 2 has the fastening means only on one side or end at the end portions of the receiving legs 4. The present embodiment has the "mirror symmetrical" arrangement of the first and second fastening means described above, according to which the same fastening means are provided at both end portions of the receiving legs 4 arranged at the same end of the respective module element, namely "first" fastening means, for example, and correspondingly identical "second" fastening means are provided at both end portions of the receiving legs 4 arranged at the opposite end of the respective module element. In this embodiment, the base module 2 has "second" fastening means only at one end at the end portions of the receiving legs 4, namely dovetail grooves 8b.

As can be seen in FIGS. 2, 3 and 5, for example, for a connection of two module elements, the dovetail tongues 8a arranged at the end portions of the two receiving legs 4 of one module element are inserted from above, i.e. from the side of the receiving legs 4 facing away from the connecting section 5, into the dovetail grooves 8b at the end portions of the receiving legs 4 of another module element.

As can be seen in the enlarged detailed views (circles "X", "Y") of FIG. 6, the dovetail groove 8b widens from the insertion opening from top to bottom and has an undercut for locking the dovetail tongue 8a when inserted into the dovetail groove 8b. To enable the dovetail tongue 8a, which is formed as a corresponding positive shape to the dovetail groove 8b, to be inserted into the aperture of the dovetail groove 8*b*, which is narrower in front of the undercut, it has two sections separated by a slot, which are slightly compressed during insertion into the dovetail groove 8*b* to allow insertion, and which return to their original position after insertion due to the elasticity of the plastic material and abut the latching surface formed as an undercut in the dovetail groove 8*b*.

The dovetail shape of the tongue and groove connection prevents unintentional separation of the module elements in the longitudinal extension direction of the rolling element cage due to the form fit, and the latching prevents unintentional lifting of the dovetail spring 8*a* out of the dovetail groove 8*b*.

In the embodiment of a modular rolling element cage 1 according to the invention shown here, the base module 2 has eight equally spaced openings 6 on each receiving leg 4. The extension modules 3*a*, 3*b* and 3*c* are shown herein by way of example with one, two and three openings, respectively, and are connected in series with the base module 2 in the sequence shown. Alternatively, for example, the extension module 3*c* with three openings can also be used as a base module and can be combined as desired with further extension modules of the same or different lengths to form a modular rolling element cage of any length according to the invention.

In the module units of the embodiment shown in FIGS. 1 to 7, passage limiters for the balls are formed at the openings 6 in the receiving legs 4 in that the diameter at the inner circumferential edge of the openings 6 tapers conically in the direction of the opposite receiving leg, so that the balls are inserted into the openings from the outside, but cannot pass through and are held in the respective opening so that they protrude from the opening to approximately the same extent on both sides of the receiving leg.

FIG. 8 shows an alternative embodiment of a passage limiter 7 at openings 6 in the receiving leg of a module element. In the sectional view through the opening 6 reproduced in FIG. 8 on the right, the rolling element 10, in this case a ball, is shown schematically by a chain-lined circle.

As can be seen in the enlarged detailed views (circles "X", "Y") of FIG. 6 as well as in FIG. 8, lubricant recesses 9 are provided at the openings 6 on the inner peripheral edge of the openings for receiving a lubricant, preferably a viscous lubricating grease.

For purposes of the original disclosure, it is pointed out that all features as they appear to a person skilled in the art from the present description, the drawings and the claims, even if they have been specifically described only in connection with certain further features, can be combined both individually and in any desired combinations with other of the features or groups of features disclosed herein, unless it has been expressly excluded or technical circumstances make such combinations impossible or pointless. A comprehensive, explicit description of all conceivable combinations of features is omitted here only for the sake of brevity and readability of the description.

While the invention has been illustrated and described in detail in the drawings and the foregoing description, this description of presentation is by way of example only and is not intended to limit the scope of protection as defined by the claims. The invention is not restricted to the embodiments shown.

Variations of the disclosed embodiments will be obvious to those skilled in the art from the drawings, description and appended claims. In the claims, the word "comprising" does not exclude other elements or steps, and the indefinite article "a" or "an" does not exclude a plurality. The mere fact that certain features are claimed in different claims does not preclude their combination. Reference signs in the claims are not intended to limit the scope of protection.

LIST OF REFERENCE SIGNS

1 roiling element cage
2 base module
3*a*, 3*b*, 3*c* extension modules
4 receiving leg
5 connecting section
6 opening
7 passage limiter
8*a*, 8*b* fastener
9 lubricant recess
10 rolling element
A direction of longitudinal extension of rolling element cage

The invention claimed is:

1. A rolling element cage for positioning a plurality of rolling elements between two rail elements of a telescopic rail or a linear guide which are mounted so as to be movable relative to one another, the rolling element cage comprising:
   two or more module elements, which comprise a base module; and
   one or more extension modules,
   wherein each module element has at least two receiving legs, each receiving leg having one or more openings for receiving the rolling elements, and at least one connecting section connecting the two receiving legs,
   wherein the base module and the one or more extension modules are fixedly or detachably connected or connectable to one another in series in the longitudinal extension direction of the rolling element cage via fastening means.

2. The rolling element cage according to claim 1, wherein the module elements have the fastening means in the longitudinal extension direction at the end portions of their receiving legs and/or at the at least one connecting portion for a form-fitting, friction-fitting and/or substance-fitting connection to at least one further module element.

3. The rolling element cage according to claim 1, the fastening means being arranged on the end portions of the receiving legs of the module elements and comprising first and second fastening means, the first fastening means being designed for a form-fitting, friction-fitting and/or substance-fitting connection to the second fastening means.

4. The rolling element cage according to claim 1, wherein the extension modules and optionally also the base module have the fastening means at both end portions of each of the at least two receiving legs, wherein the fastening means comprises a first fastening means provided at one end portion of a receiving leg and a second fastening means provided at the opposite end portion of the the receiving leg, wherein the second fastening means are configured for a form-fitting, friction-fitting and/or substance-fitting connection to the first fastening means, and
   wherein:
   a) equal first or second fastening means are arranged at the end portions of the receiving legs which are arranged at the same end of the module element in the longitudinal extension direction, or
   b) different first or second fastening means are arranged at the end portions of the receiving legs which are arranged at the same end of the module element in the longitudinal extension direction.

5. The rolling element cage according to claim 1, wherein the fastening means on the module elements are formed as tongue-and-groove connections or as trunnion and mortise connections.

6. The rolling element cage according to claim 5, wherein the fastening means on the module elements are formed as the tongue-and-groove connection and wherein the tongue-and-groove connection is a dovetail tongue-and-groove connection.

7. The rolling element cage according to claim 1, wherein the fastening means on the module elements have at least one latching recess, an undercut, a latching nose or a toothing for a latching engagement.

8. The rolling element cage according to claim 1, wherein the module elements of the rolling element cage are each manufactured in one piece and separately from one another.

9. The rolling element cage according to claim 1, wherein the module elements each have exactly two receiving legs and at least one connecting section connecting the two receiving legs, and the receiving legs are arranged angled at an angle of about 80 to 100° to the at least one connecting section, forming a substantially C-shaped cross section.

10. The rolling element cage according to claim 9, wherein the receiving legs are perpendicular to the at least one connecting section, forming the substantially C-shaped cross section.

11. The rolling element cage according to claim 1, wherein the rolling element cage is a ball cage and the openings on the receiving legs are each designed to receive one or more balls as the rolling elements.

12. The rolling element cage according to claim 1, wherein passage limiters are provided at the openings in the receiving legs for receiving the rolling elements to prevent the rolling elements from passing completely through the openings.

13. The rolling element cage according to claim 12, wherein the passage limiters are in the form of contact surfaces, lugs or projections arranged on the openings and extending at an angle out of the plane of the respective receiving leg.

14. The rolling element cage according to claim 12, wherein the passage limiters are formed in an inner circumferential edge of opening tapers, at least in sections, in the shape of a cone or dome.

15. The rolling element cage according to claim 1, wherein the openings distributed in the receiving legs of the rolling element cage in the longitudinal extension direction for receiving the rolling elements are arranged at equal distances from one another or are arranged at increasing or decreasing distances from one another in the longitudinal extension direction of the rolling element cage from the base module to the last extension module, or are arranged at increasing distances from one another in the longitudinal direction of the rolling element cage from two end sections to a center of the rolling element cage.

16. The rolling element cage according to claim 1, wherein cutouts or pockets are provided at or in the openings in the receiving legs for receiving the rolling elements.

17. The rolling element cage according to claim 16, wherein the cutouts or pockets are designed and suitable for receiving a viscous or pasty lubricant.

18. A telescopic rail or linear guide with rail elements mounted so as to be movable relative to one another and at least one rolling element cage according to claim 1 and with the rolling elements accommodated in the openings of the rolling element cage.

19. The rolling element cage according to claim 1, wherein the module elements of the rolling element cage are each manufactured in one piece and separately from one another from thermoplastic polymer by injection molding.

20. The rolling element cage according to claim 19, wherein the thermoplastic polymer is polyoxymethylene (POM).

* * * * *